Aug. 29, 1961    W. E. ALTMANN    2,998,114
DISENGAGEABLE CLUTCH CONSTRUCTION
Filed Jan. 13, 1958    2 Sheets-Sheet 1
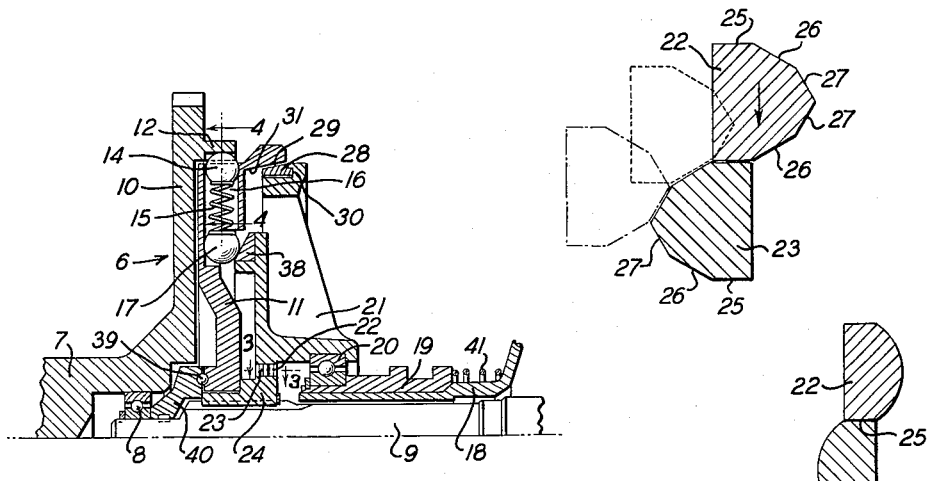
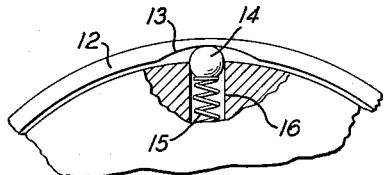
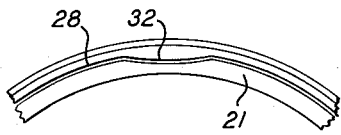
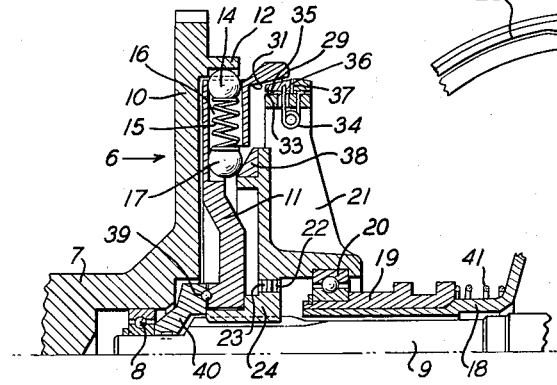
INVENTOR
WERNER E. ALTMANN
BY Dicke & Craig
ATTORNEYS

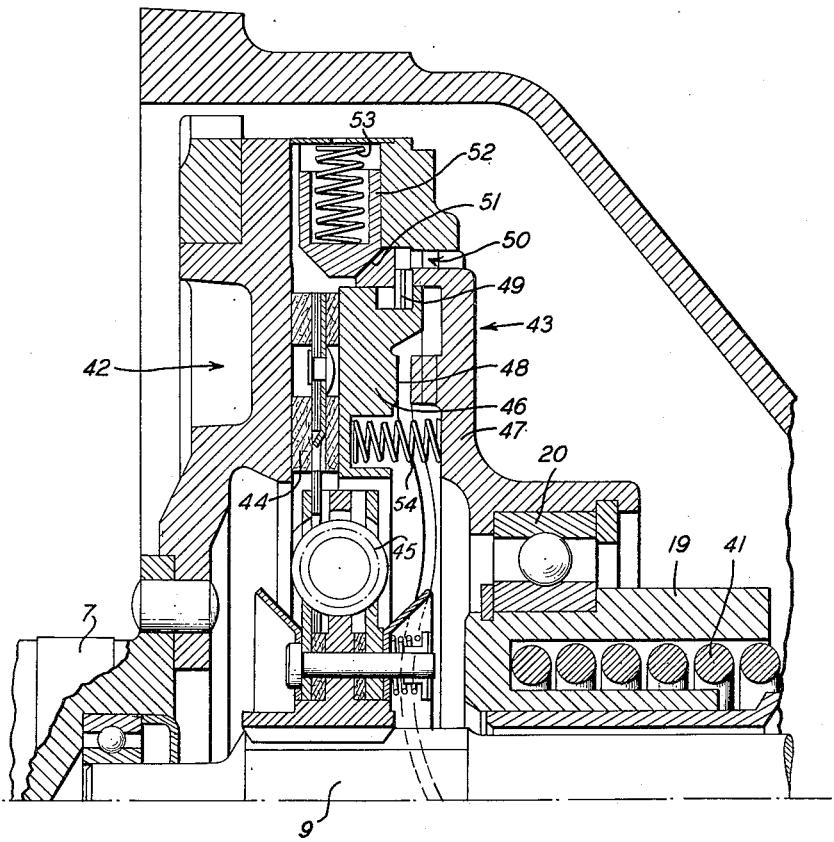

United States Patent Office 2,998,114
Patented Aug. 29, 1961

2,998,114
DISENGAGEABLE CLUTCH CONSTRUCTION
Werner E. Altmann, Stuttgart, Germany, assignor to Daimler-Benz Aktiengesellschaft, Stuttgart-Unterturkheim, Germany
Filed Jan. 13, 1958, Ser. No. 708,413
Claims priority, application Germany Jan. 17, 1957
37 Claims. (Cl. 192—52)

The present invention relates to a disengageable shaft clutch, especially for motor vehicles, in which one of the clutch halves is axially movable with respect to the other clutch half for purposes of engagement and disengagement.

The present invention aims at avoiding the clutching shocks which occur during the engagement of the two clutch halves of a disengageable shaft clutch by an appropriate construction thereof and to simultaneously reduce the forces necessary for actuation of the clutch to a reasonable degree.

According to the present invention, this problem is solved in that, in connection with clutches of the type mentioned hereinabove, the axially movable clutch half and the shaft coordinated thereto or operatively connected therewith is provided, for purposes of transmission of torque, with surfaces extending essentially in parallel to the axis and axially adjacent thereto with inclined surfaces, and in that a synchronizing ring is provided at one of the clutch halves which is adapted to engage into frictional engagement with the other clutch half in such a manner that the synchronizing ring permits engagement of both clutch halves only upon attaining synchronism.

According to another feature of the present invention, the transmission surfaces which are coordinated to the shaft are arranged at a counterpiece which is rigidly secured on the shaft. As a result of such a construction, the axially immovable clutch half or the part thereof carrying the engaging surfaces is thereby supported in the axial direction at the shaft or at the counterpiece of the axially movable clutch half.

The synchronizing ring in accordance with the present invention is preferably formed as a radially springy, slotted ring having a conical friction surface and is guided with radial play at one of the clutch halves. However, according to another feature of the present invention, the synchronizing ring may also be constructed as a ring fully closed upon itself provided with a conical friction surface and may be guided with axial play under spring tension at one of the clutch halves. Advantageously, this last-mentioned type of synchronizing ring is coordinated to or operatively connected with the axially movable clutch half.

The synchronizing ring blocks or prevents the engagement of both clutch halves as long as a relative movement exists therebetween. This is achieved by the inherent elasticity of the ring itself and/or by the fact that it is provided with surfaces inclined to the circumferential and/or axial direction, for example, with special separate lifting cams, the complementary countersurfaces of which are arranged at the clutch half which carries the same, for example, at the axially movable clutch half. The inclined surfaces may form with a synchronizing ring closed upon itself over the entire circumference thereof, curved tracks or cam surfaces closed upon themselves which may be, for example, of sinusoidal shape.

The transmission surfaces provided in accordance with the present invention for purposes of transmitting torque between the shaft and the counterpiece or the axially movable clutch half are appropriately formed as alternately interengaging, radial pins on both parts, preferably symmetrically arranged to the clutch axis. The pins are provided with surfaces parallel to the clutch axis, adjacent thereto with surfaces having a relatively smaller inclination, and adjacent the surfaces with smaller inclination with additional surfaces having a relatively greater or more pronounced inclination. By the use of such construction, the pins abut against each other in the disengaged or unclutched condition with the surfaces thereof extending in parallel to the clutch axis, whereas in the synchronizing position they abut against each other with the surfaces of relatively smaller inclination and in the engaging position with the surfaces having a more pronounced inclination.

The clutch in accordance with the present invention avoids the clutching shock completely since, prior to engagement, both clutch halves are brought to the same rotational speed by the frictional engagement of the synchronizing ring. Simultaneously therewith, an axial force component is produced by the inclined transmission surfaces between the shaft or counterpiece and the axially movable clutch half which axial force component automatically effects the abutment of the synchronizing ring and the engagement of both clutch halves as well as the retention of the engagement under the influence of the torque. The heavy clutch springs normally found in such constructions may, therefore, be dispensed with. As a result thereof, a further considerable advantage may be achieved by the present invention in that the force for purposes of disengagement of the clutch need only be as large as is necessary in order to disturb the frictional engagement resulting from the axial component produced by the inclined transmission surfaces. As soon as such a force is attained, the engagement is automatically released, so to speak.

The engaging surface is constructed as a friction surface of truncated conical shape which is provided with the same conical inclination as the synchronizing ring. This inclination is matched to the inclinations of the transmission surfaces in such a manner that the value of the axial component is sufficient for the complete engagement only when the more strongly inclined transmission surfaces abut against each other.

According to a further feature of the present invention, the axially movable clutch half is under the influence of a spring tension which may be possibly adjusted either in and/or against the direction of engagement thereof whereby one of the spring tensions, appropriately the one effective in the direction opposite the engaging direction, is automatically adjusted in dependence on the rotational speed. For that purpose, radial recesses or guide means are provided in the axially immovable clutch half or a part thereof in the outer parts of which pretensioned and possible adjustable springs are arranged and in the inner parts of which rolling bodies, for example, ball members, are accommodated. An abutment surface of conical truncated shape, which is possibly axially adjustable, is coordinated to these rolling bodies, for example, to ball members, in such a manner that upon inward deflection or movement of the ball members as a result of the spring tension the axially movable clutch half is disengaged.

By the use of such a construction, it may be achieved that the clutch is automatically disengaged below a predetermined rotational speed, which may be selected, for example, slightly above the idling speed, and upon exceeding this preselected rotational speed is again automatically engaged. As a result of the slight disengaging force of the clutch, this interplay of forces may be readily controlled. The clutch in accordance with the present invention may, therefore, be used to great advantage as a so-called automatic clutch.

Furthermore, the axially immovable clutch half may appropriately consist of two essentially disk-shaped parts which are resiliently connected with each other for purposes of damping rotational vibrations. One of these disk-like parts extends over the other with a cylindrical edge portion along the outer periphery thereof. Pockets or indentations are provided within the circumference of the projecting edge portion for purposes of engagement with rolling bodies, for example, ball members, which are arranged under spring tension in radial recesses of the other part.

The clutch may thereby be used also as rotational vibration damping means and with corresponding dimensioning of the pockets and springs possibly also as an overload clutch.

It is thereby advantageous to support the rolling bodies intended for cooperation with the axially movable clutch half and possibly also the rolling bodies provided for cooperation with the other disk-like part in the same part of the axially immovable clutch half. The two rolling bodies may then be combined by means of a common spring tension so that in each radial recess or guide means two rolling bodies, for example, ball members, and a spring disposed therebetween are arranged. Such an arrangement results in a constructional simplification. The arrangement in different parts or in separate radial recesses, in contrast thereto, may be used for purposes of obtaining an improved adjustability of the device.

According to another construction in accordance with the present invention, one of the clutch halves may include an axially immovable part and an axially movable part with the other clutch half being formed by a clutch disk disposed therebetween. The axially movable part of one of the clutch halves which may be constructed as a clutch pressure disk may simultaneously serve as synchronizing ring which is carried by another part against which it may abut over a sinusoidal curved track or cam with spreading springs arranged therebetween.

Accordingly, it is an object of the present invention to provide a disengageable clutch which is simple in construction and reliable in operation, which may be readily assembled and disassembled, and which is relatively simple to adjust.

Another object of the present invention is to provide a disengageable clutch in which the shocks normally occurring during engagement of the clutch are completely eliminated.

A still further object of the present invention resides in the provision of a disengageable clutch having two clutch halves in which the forces necessary for engagement, and particularly for disengagement thereof, are considerably reduced.

A further object of the present invention is the provision of a disengageable clutch having two clutch halves in which the parts to be clutched together are synchronized prior to complete engagement thereof so as to minimize any shocks or vibrations.

Another object of the present invention is to provide such a construction of a disengageable clutch as produces an automatic engaging force for purposes of engaging the two clutch halves once the engagement thereof is initiated and essential synchronization between the two clutch halves is obtained.

A further object of the present invention is the provision of a clutch construction of the disengageable type in which a force is produced which automatically retains the clutch halves engaged once such engagement has been effected.

A further object of the present invention resides in the provision of a disengageable clutch construction which reduces the number of parts necessary therefor, particularly one which permits the omission of heavy clutch springs.

Another object of the present invention is the provision of an arrangement and construction of a disengageable clutch in which the engaging and disengaging forces necessary for operation of the clutch are relatively small, and in which a force component is produced which automatically aids or even effects engagement and disengagement.

Still another object of the present invention is the provision of a disengageable clutch having all the advantages and features mentioned hereinabove which at the same time dampens the vibrations caused by the rotation of the parts and which may also be used as an overload clutch.

These and other objects, features and advantages of the present invention will become more obvious from the following description when taken in connection with the accompanying drawing which shows, for purposes of illustration only, several embodiments in accordance with the present invention, and wherein:

FIGURE 1 is a partial axial cross-sectional view through a first embodiment of a disengageable clutch construction for a motor vehicle in accordance with the present invention;

FIGURE 2 is a partial axial cross-sectional view through a modified embodiment of a disengageable clutch for motor vehicles in accordance with the present invention;

FIGURE 3 is a partial cross-sectional view taken along line 3—3 of FIGURE 1;

FIGURE 4 is a partial cross-sectional view taken along line 4—4 of FIGURE 1;

FIGURE 5 is a partial view of a synchronizing ring;

FIGURE 6 is a cross-sectional view similar to FIGURE 3 of a different embodiment of the pins which may be used in a disengageable clutch according to the present invention; and FIGURE 7 is a partial axial cross-sectional view of still a further modified embodiment of a disengageable clutch in accordance with the present invention.

Referring now to the drawing, wherein like reference numerals are used throughout the various views, and more particularly to FIGURE 1, the clutch consists of an axial immovable clutch half generally designated by reference numeral 6 which is driven by the drive shaft 7. The driven shaft or output shaft 9 of the clutch is suitably journalled or supported in a ball bearing 8 within the drive shaft 7. The axially immovable clutch half 6 consists of two disk-like parts 10 and 11 which are connected with each other in a manner of a rotational vibration damper. The part 10 thereby overlaps the part 11 with the cylindrical rim or flange portion 12.

As may be seen from FIGURE 4, pockets or recesses 13 are provided within the inner circumference of the cylindrical rim portion 12 into which engage ball members 14 which are supported by means of springs 15 in radial recesses 16 of the second axially immovable clutch part 11. Instead of the ball members 14, other rolling bodies may be used, for example, rollers or possibly also slide members or the like. The recesses 16 are constructed as bores in the illustrated embodiment. However, the recesses 16 may also be replaced by appropriate guide means of any suitable construction. In the same recesses 16 additional ball members 17 or other appropriate roller bodies are arranged which are supported or spring-loaded by the same springs 15.

An axially displaceable shifting sleeve 19 is supported on a bushing-like housing projection 18 which shifting sleeve 19 carries the axially movable clutch half 21 over a ball bearing 20. The transmission of torque takes place from the clutch half 21 to the output shaft 9 over interengaging radial pins 22 and 23, the details of which and cross-sectional shapes of which are shown in FIGURE 3, and which are arranged alternately at two relatively axially movable parts of the clutch, namely at the clutch half 21 and at the counterpiece 24 which is supported axially immovably on and for common rotation with the output shaft 9.

Each of the pins 22 and 23 (FIGURE 3) is provided with surfaces 25 extending in parallel to the clutch axis which are followed by surfaces 26 and 27 which are inclined to the axis. The inclination of the two surfaces 26 and 27 is different, and more particularly, the surfaces 26 which are next adjacent the surfaces 25 parallel to the axis have a relatively smaller inclination whereas the surfaces 27 which follow the surfaces 26 have a more pronounced or relatively larger inclination. In the position illustrated in FIGURE 3 which corresponds to the unclutched or disengaged position, the pins 22 and 23 abut against each other with the surfaces 25 thereof which extend in parallel to the clutch axis.

The axially movable clutch half 21 is provided at the outer circumference thereof with a synchronizing ring 28. The synchronizing ring 28 according to FIGURE 1 is constructed as a springy slotted ring having a conical friction surface 29. The synchronizing ring 28 is guided inwardly with radial play with the projection 30 thereof within the clutch half 21. A conical engaging surface 31 of the same inclination is arranged at the part 11 of the axially immovable clutch half 6 which cooperates with the synchronizing ring 28.

As shown in FIGURE 5, one or several separate lifting cam surfaces 32 are provided along the inner surface of synchronizing ring 28 which are intended to reinforce the outwardly directed inherent elasticity or flexibility of the synchronizing ring 28 so as to achieve a safe locking effect. However, it is understood that other lifting cam surfaces of different configuration may be provided, for example, it may suffice to bevel off the ends of the slotted ring 28 and to provide correspondingly beveled securing pins.

Operation

The operation of the disengageable clutch according to FIGURE 1 is as follows:

In the position illustrated in FIGURE 1, the clutch is disengaged. The engagement of the clutch may take place either manually or automatically. For puropses of manual engagement, the shifting sleeve 19 is moved toward the left as viewed in the drawing by a clutch lever (not shown) against the tension of the spring 15. As a result of the movement toward the left of the shifting sleeve 19, the clutch half 21 is also moved toward the left until the synchronizing ring 28 comes into abutment with the friction surface 29 thereof at the engaging surface 31 of the part 11 of the axially immovable clutch half 6. At the same time, the pins 22 and 23 have moved relative to each other so that the surfaces 25 which extend in parallel to the clutch axis have slipped off from engagement with each other and the pins assume the position shown in dashed lines in FIGURE 3 with the inclined surfaces 26 of relatively smaller inclination abutting against each other. Since a difference in speed exists between the two clutch halves 6 and 21, the synchronizing ring 28 is taken along by frictional engagement in the direction of rotation of the clutch half 6, and the frictional moment produces as a result of the inclined surfaces 26 an axial component at the clutch half 21 which seeks to move the same into the direction of engagement of the latter, i.e., toward the left as viewed in FIGURE 1, and therewith reinforces the frictional engagement between surfaces 29 and 31. However, the inherent, outwardly-directed elasticity of the synchronizing ring 28 itself prevents a further movement of the clutch half 21 toward the left, as viewed in FIGURE 1. The inherent elasticity of the synchronizing ring 28 is thereby aided so that the cam surfaces 32 provided thereat run up, as a result of the friction moment, along the corresponding countersurfaces at the clutch half 21 and as a result thereof prevent a radial compression of the synchronizing ring 28.

The inclination of the transmission surfaces 26 and of the cam tracks or surfaces 32 is so matched to the inclination of the engaging surfaces 29 and 31 that no force-locking engagement can take place. The frictional engagement in this condition continues for such length of time until synchronism between the two clutch halves 6 and 21 exists. If the condition of synchronism is reached, then as a result of the absence of any relative movement between the parts, the synchronizing ring 28 may be radially compressed by the pressure or force exerted at the shifting lever (not shown) and therewith at the shifting sleeve 19 and thereby may be forced to retract inwardly. As a result thereof, the clutch half 21 may be moved further toward the left by the pressure at the shifting sleeve 19 so that the pins 22 and 23 may reach the position indicated in FIGURE 3 in dashed and dotted lines, i.e., the pins 22 and 23 now abut against each other with the strongly inclined surfaces 27 thereof. The relatively strong axial component which is thereby produced by the torque forces the conical surfaces 31 and 29 against each other into force-locking engagement, and the clutching engagement is completed. The engaging process takes place nearly automatically. The movement only has to be initiated manually and a slight pressure has to be maintained in the direction of engagement at the shifting lever.

During automatic clutch engagement, the axially immovable clutch half 6 is accelerated by giving sufficient gas up to such a speed until the ball members 17 are forced outwardly by centrifugal force against the action of springs 15. As a result thereof, the countersurface 38 is released and the relatively weak spring 41 moves the shifting sleeve 19 and therewith the axially movable clutch half 21 in the engaging direction toward the left. As soon as the pins 22 and 23 have slipped off sufficiently to provide abutment thereof along the inclined surfaces 26, the shifting process, analogous to the one described hereinabove, begins to take place independently of the spring tension 41.

In the engaged condition, both parts 10 and 11 of the axially immovable clutch half 6 operate as a rotational vibration damper. If the rotational speed falls below a predetermined value, then the inner ball members 17 are forced inwardly by the spring members 15. As a result thereof, the ball members 17 abut against the inclined surface of ring 38 and therewith force the clutch half 21 again toward the right, i.e., effect disengagement thereof. If the rotational speed of the driving engine is increased, then the centrifugal force moves the ball members 17 again outwardly and the spring 41 moves the clutch half 21 over shifting sleeve 19 again into the engaging direction.

The embodiment according to FIGURE 2 is essentially similar to that of FIGURE 1. However, FIGURE 2 includes a synchronizing ring 33 which is closed upon itself and which in turn is provided with a conical friction surface 29. The synchronizing ring 33 is resiliently connected by several hair pin springs 34 evenly distributed along the circumference thereof with the clutch half 21 carrying the same in such a manner that the synchronizing ring 33 is moved in the direction toward the engaging surface 31 at the other clutch half 6. A blocking or securing device 35 of any suitable construction limits this movement. The synchronizing ring 33 which is closed upon itself is provided with axially effective inclined surfaces 36 which are combined over the entire circumference thereof into sinusoidally shaped or otherwise shaped curved tracks or cams closed upon themselves. The correspondingly shaped complementary curved track or cam 37, for example, also of sinusoidal shape, is arranged at the clutch half 21.

A conical ring 38 at the axially movable clutch half 21 is coordinated to the inner ball members 17 in the part 11 of the axially immovable clutch half 6. If, as a result of the spring tension of springs 15, the ball members 17 move inwardly, then the axially movable clutch half 21 is moved toward the right, i.e., against the direction of engagement thereof. The part 11 of the axially immovable clutch half 6 is supported over a ball bearing 39 at the abutment member 40 which in turn is secured on the output or driven shaft 9 or at the counterpiece 24 in an axially immovable manner and possibly is also secured thereto for common rotation therewith. A spring 41 forces the shifting sleeve 19 and therewith the clutch half 21 into the direction of engagement thereof.

*Operation*

In the position illustrated in FIGURE 2, the clutch again is disengaged. Engagement thereof may take place either manually or automatically. For purposes of manual engagement, the shifting sleeve 19 is moved manually by means of a clutch lever (not shown) against the tension of the spring 15 toward the left as seen in FIGURE 2. By such movement of the shifting sleeve 19, the clutch half 21 is also moved toward the left until the synchronizing ring 33 with the friction surface 29 thereof reaches engagement with the engaging surface 31 of the part 11 of the axially immovable clutch half 6. At the same time, the pins 22 and 23 have slidden off from the surfaces 25 extending in parallel to the axis of the clutch and abut against each other, as illustrated in FIGURE 3 in dashed lines, with the surfaces 26 thereof having a relatively smaller inclination.

Since a rotational speed difference exists between the two clutch halves 6 and 21, the synchronizing ring 33 is taken along in the direction of rotation of the clutch half 6 by a frictional engagement and the frictional moment produces, as a result of the inclined surfaces 26, an axial component at the clutch half 21 which seeks to move the latter in the direction of engagement thereof and therewith reinforces the frictional engagement.

With a construction including the synchronizing ring 33 which is closed upon itself, the same blocking effect is obtained as in connection with FIGURE 1, in that under the influence of the friction moment the synchronizing ring 33 is rotated to such an extent with respect to the clutch half 21 until the sinusoidally shaped curved tracks 36 and 37 abut against each other with the raised portions thereof and thereby prevent the synchronizing ring 33 from receding toward the right with respect to the clutch half 21.

The inclination of the transmission surfaces 26 and of the sinusoidally shaped curved tracks 36 and 37 is so matched to the inclination of the engaging surfaces 29 and 31 that no force-locking engagement can take place. The frictional engagement in this condition prevails for such length of time until the same rotational speed exists between both clutch halves 6 and 21. If this condition of synchronism is achieved, then the synchronizing ring 33 slides along the sinusoidal curved track 37 of the clutch half 21 until the raised portions of one of the two parts thereof pass over into the recessed portion of the other part and therewith recedes with respect thereto toward the right. When this is achieved, the clutch half 21 may be moved by the continued application of pressure at the shifting lever and therewith at the shifting sleeve 19 further toward the left, as viewed in FIGURE 2, so that the pins 22 and 23 may reach the position indicated in dot and dash lines in FIGURE 3, i.e., pins 22 and 23 now abut against each other with the relatively more inclined surfaces 27 thereof. The relatively strong axial components produced by the torque in that condition forces the conical surfaces 31 and 29 into force-locking engagement with each other and the clutch engagement is completed. The engaging process thereby also takes place nearly automatically. The movement is only to be initiated manually and a slight pressure in the direction of engagement needs to be maintained at the shifting lever (not illustrated).

The automatic engagement and disengagement of the clutch illustrated in FIGURE 2 again takes place in the same manner as described in connection with FIGURE 1 by the interplay between the centrifugal force acting on the ball members 17 and the spring force exerted by springs 15 which forces the ball members 17 inwardly to thereby move the conical surface of the ring 38 toward the right and therewith disengage the clutch when the speed of the driving shaft 7 falls below a predetermined value. The engagement of the clutch under the influence of the centrifugal force again takes place in the same manner as in connection with FIGURE 1.

FIGURE 6 illustrated a different embodiment of the construction of the pins 22 of the clutch half 1 and of the pins 23 at the counterpiece 24. Both pins are constructed as having a semi-circular cross section into which only the surfaces 25 are machined which extend in parallel to the clutch axis. However, it is understood that only one of the two pins may be constructed as shown in FIGURE 6 and may cooperate with a pin constructed as shown in FIGURE 3, i.e., one of the sets of pins 22 and 23 may be provided with the surfaces 25, 26 and 27 whereas the other set of pins 22 and 23 may be provided with the surfaces 25 and the semi-circular surface shown in FIGURE 6.

FIGURE 7 shows a further modification in accordance with the present invention incorporating therein the principle described hereinabove. In the embodiment according to FIGURE 7, the clutch half, which is driven by the drive shaft 7, consists of an axially immovable part generally designated by reference numeral 42 and of an axially movable part generally designated by reference numeral 43. A clutch disk 44 of known construction serves as the other clutch half which, as is usual, is connected with the output driven shaft 9 over vibration damping intermediate members, for example, in the form of coil or helical springs 45 essentially disposed in the circumferential direction. The coil springs 45 are arranged in appropriate apertures provided in the parts accommodating the same. Since such a construction is known in the art, a detailed description thereof is dispensed with herein. The clutch disk 44 is disposed, as is the case also in connection with other known types of clutches, between the axially movable part 43 and the axially immovable part 42 of the clutch half driven by the engine over shaft 7.

The axially movable clutch part 43 consists of a pressure disk 46 of annular construction and the part 47 which carries the pressure disk 46. The pressure disk 46 serves simultaneously as synchronizing ring and is supported by means of sinusoidally shaped curved tracks 48 at the carrier part 47 and is also rotatable with respect thereto by a limited angular displacement. As a result of such a construction, the pressure disk 46 may assume, in the manner described hereinabove, two different extreme axial positions with respect to the carrier part 47, namely one in which the crests or peaks of the sinusoidally shaped tracks of parts 46 and 47 cam each other and another in which they interengage with each other along the complementary track surfaces. Limit pins 49 limit the axial movement of the pressure disk 46 to a value which is smaller than the lift of the sinusoidally shaped curved tracks 48.

The carrier part 47 is further provided at the outer circumference thereof with radial pins, generally designated by reference numeral 50, which are constructed in the manner disclosed in connection with FIGURE 3 to provide inclined transmission surfaces. Counterpins (not shown) of similar construction are provided at the axially immovable clutch part 42 or a part rigidly connected therewith so that an axial movement may be produced from the torque in the manner already described hereinabove in connection with the embodiments of FIGURES 1, 2, 3 and 6.

Directly adjacent the transmission pins 50, a surface 51 of conically truncated shape is arranged at the carrier part 47 which cooperates with the flyweights 52 supported in the axially immovable part 42. The flyweights 52 are pretensioned inwardly by springs 53 and thereby automatically move the axially movable part 43 toward the right into the disengaged position thereof if the rotational speed of shaft 7 falls below a predetermined minimum speed.

The effect of the flyweight 52 is the same as that of the ball members 17 described in connection with FIGURES 1 and 2 and produces the same operational control.

The carrier part 47 of the axially movable clutch part 43 is in turn supported on a shifting sleeve 19 by means of a bearing 20, the shifting sleeve 19 being pretensioned again in the direction of engagement by the spring 41. A shifting lever (not illustrated) again engages the shifting sleeve 19 in the conventional manner. The spring 41 only needs to be of relatively weak spring tension so that only relatively slight forces suffice for disengagement of the clutch. By an appropriate matching of the spring 41 with respect to the flyweight springs 53, an automatic clutch actuation is again made possible as also described in connection with FIGURES 1 and 2. One or preferably several compression springs 54 are arranged between the carrier part 47 and the pressure disk 46 which normally seek to spread the same apart.

*Operation*

The operation of the clutch illustrated in FIGURE 7 is essentially the same as described hereinabove in connection with FIGURES 1 and 2.

Engagement of the clutch may take place either manually by actuating the shifting lever (not shown) to thereby move the shifting sleeve 19 toward the left or automatically, as will be described more fully hereinafter.

For purposes of manual engagement, the shifting sleeve 19 is moved against the tension of springs 53 toward the left until the synchronizing ring formed by the pressure disk 46 is brought into engagement with the clutch disk 44. At the same time, the pins 50 and counterpins (not shown) which may be constructed as shown in FIGURE 3 have slipped off the engaging surfaces 25 thereof extending in the axial direction of the clutch to engage with each other and abut against each other along the relatively slightly inclined surfaces 26 thereof. Since a difference of speed exists between the two clutch halves 43 and 44, the pressure disk 46 which has a limited play is taken along in the circumferential direction by the torque and the frictional moment produced thereby causes, as a result of the inclined surfaces 26, an axial component at the clutch half 43 seeking to move the latter in the direction of engagement thereof toward the left as viewed in FIGURE 7 and therewith to reinforce the frictional engagement with the clutch half 44 made of any suitable friction material.

A blocking effect preventing full engagement for the time being is obtained by means of the pressure disk 46 acting as synchronizing ring by the fact that under the influence of the frictional moment the synchronizing ring 46 is rotated with respect to the carrier part thereof 47 to such an extent until the sinusoidally shaped curve tracks 48 abut with the crests thereof against the sinusoidally shaped curve tracks provided in the carrier part 47 and therewith prevent the pressure disk 46 from moving relative to the clutch half 44 toward the right. The frictional engagement in this condition prevails for such a length of time until synchronism exists between the two clutch halves 42 and 43, on the one hand, and 44, on the other. If this condition of synchronism is achieved, then, by reason of lack of relative movement between the pressure disk 46 and clutch disks 44, the pressure disk or synchronizing ring 46 slides along the sinusoidal track provided in the carrier part 47 until the raised portion of the one (48) passes over into the recessed portion of the other and thereby is able to move toward the right as viewed in FIGURE 7 with respect to the carrier part 47. This adjustment of the parts 46 and 47 permits that the clutch half part 47, 46 may be moved further toward the left by the continued pressure at the shifting sleeve 19 exerted thereon by the shifting lever (not shown) so that the pins 50 at the carrier part 47 and the complementary pins (not shown) at the clutch part 42 reach a position corresponding to that shown in the dot and dash lines illustrated in FIGURE 3, i.e., so that the pins abut against each other with the surfaces 27 thereof having a relatively greater inclination. The axial force components which are then relatively strong and which are thereby produced by the torque, further urge the pressure disk 46 into engagement with the clutch half 44 to thereby produce full engagement of the clutch. Again, the engagement described hereinabove takes place almost automatically. The movement only has to be initiated manually at the shifting sleeve 19 and a slight pressure has to be maintained at the shifting lever and therewith at the shifting sleeve 19.

The automatic engagement of the clutch again may be obtained by speeding up the engine so that the axially immovable part 42 is accelerated whereby the flyweight members 52 are moved outwardly under the influence of the centrifugal force against the force exerted thereon by the springs 53. The radially outward movement of the flyweight members 52 makes it possible for the inclined conical surface 51 provided in the carrier part 47 to move toward the left to remain in engagement with the inclined conical surfaces of each flyweight member under the force of the spring 41. Consequently, as the flyweight members 52 are moved outwardly, under the influence of the centrifugal force, the spring 41 is able to produce an engagement of the clutch by the continued movement toward the left of the axially movable clutch part 47 and therewith of the pressure disk 46.

As soon as the speed of the axially immovable part 42 drops below a predetermined level, the force of the springs 53 again moves the flyweight members 52 radially inwardly thereby bringing into contact the conical surfaces thereof and those (51) provided at the carrier part 47 so that continued inward movement of the flyweight members 52 moves the carrier part 47 and therewith also the pressure disk 46 toward the right thereby producing disengagement of the clutch half.

As to the rest, the operation of the disengageable clutch shown in FIGURE 7 is the same as that described in connection with FIGURES 1 and 2. Furthermore, the pins 50 and those provided at the relatively immovable part 42 complementary to the pins 50 may each be constructed either as shown in FIGURE 3 or as shown in FIGURE 6. The abutment surfaces 48 at the parts 46 and 47 may be of any suitable construction other than sinusoidally shaped cam surfaces as pointed out hereinabove with respect to the embodiments of FIGURES 1 and 2.

While I have shown several preferred embodiments in accordance with the present invention, it is understood that the same is not limited thereto, but is susceptible of many changes and modifications within the spirit of the present invention, and I intend to cover all such changes and modifications as encompassed by the appended claims.

I claim:

1. A disengageable force-locking shaft clutch, particularly for motor vehicles, with input and output means comprising at least one of said input and output means at least two clutch parts, one of said clutch parts being axially movable with respect to the other clutch part, shaft means for one of said input and output means, transmitting means operatively connected in said clutch to be effective between said parts and constituting transmission surfaces to produce an axial force seeking to engage the clutch, said clutch including friction surfaces for interconnecting said input and output means and synchronizing ring means forming part of said friction surfaces to enable sliding frictional engagement of said friction surfaces and operative to normally prevent force-locking engagement of said friction surfaces until essentially synchronism exists therebetween.

2. A disengageable shaft clutch according to claim 1, wherein said transmitting means includes transmission surfaces extending parallel to the axis of said clutch and transmission surfaces adjacent thereto inclined to said axis, further comprising counterpart means rigidly connected on said shaft means and provided with some of said transmission surfaces cooperating with the other transmission surfaces provided at one of said clutch parts.

3. A disengageable shaft clutch according to claim 1, wherein the other of said clutch parts is axially immovable and is supported on said shaft means.

4. A disengageable shaft clutch according to claim 1, further comprising spring means spring loading said one clutch part in at least one of the two directions consisting of the engaging and disengaging directions.

5. A disengageable shaft clutch according to claim 4, wherein said spring means are automatically adjusted with respect to the spring tension thereof in dependence on the rotational speed.

6. A disengageable shaft clutch according to claim 1, wherein said synchronizing ring means is a radially flexible slotted ring provided with a conical friction surface and is guided at one of said clutch parts with radial play.

7. A disengageable shaft clutch according to claim 1, wherein said synchronizing ring means is a ring closed upon itself provided with a conical friction surface and is guided under spring tension with axial play at one of said clutch parts.

8. A disengageable shaft clutch according to claim 7, further comprising a plurality of evenly distributed hairpin springs, one of the leg portions of said springs engaging in said synchronizing ring means and the other in the clutch part carrying the same.

9. A disengageable shaft clutch according to claim 1, wherein said synchronizing ring means and said one clutch part are provided with inclined corresponding cam surfaces.

10. A disengageable shaft clutch according to claim 9, wherein said cam surfaces extend in the circumferential direction.

11. A disengageable shaft clutch according to claim 9, wherein said cam surfaces extend in the axial direction.

12. A disengageable shaft clutch according to claim 9, wherein said cam surfaces extend in both the circumferential and axial directions.

13. A disengageable shaft clutch according to claim 1, wherein said synchronizing ring means and said one clutch part are provided with inclined abutment surfaces of complementary sinusoidal shape closed upon themselves and constituting cam tracks.

14. A disengageable shaft clutch according to claim 1, wherein said synchronizing ring means is coordinated to said axially movable clutch part.

15. A disengageable shaft clutch according to claim 1, wherein a clutch part is axially immovable and is provided with radial guide means accommodating therein spring-loaded roller means cooperating with said one axially movable clutch part to block axial movement of the latter and prevent engagement of said clutch until said radial guide means rotates in excess of predetermined speed.

16. A disengageable shaft clutch according to claim 15, further comprising cam surface means for said roller means in said axially movable clutch part, said cam surface means being of conically truncated shape and axially adjustable so as to disengage the axially movable clutch part upon deflection of said roller means inwardly.

17. A disengageable shaft clutch according to claim 16, wherein said axially immovable clutch part consists of two essentially disk-shaped parts springily connected with each other to provide a rotational vibration damper.

18. A disengageable shaft clutch according to claim 17, wherein one of said two disk-shaped parts projects beyond the other disk-shaped parts with a cylindrical rim portion along the outer circumference thereof and is provided at the inner circumference of said rim portion with recesses, and spring-loaded roller means accommodated in the other disk-shaped parts and cooperating with said recesses.

19. A disengageable shaft clutch according to claim 18, wherein both of said sets of roller means are arranged in the same portion of the axially immovable clutch part.

20. A disengageable shaft clutch according to claim 19, wherein said roller means are combined by a common spring so that each guide means accommodates two roller means in the form of balls with a spring disposed therebetween.

21. A disengageable shaft clutch according to claim 1, wherein said friction surfaces are provided between said synchronizing ring means and another clutch part which are friction surfaces of complementary truncated conical shape.

22. A disengageable shaft clutch according to claim 1, wherein said transmitting means are constituted by radial pins symmetrically arranged with respect to the clutch axis and secured in the two parts consisting of said shaft means and said one clutch part.

23. A disengageble shaft clutch according to claim 22, wherein at least one of said pins is provided with a surface extending parallel to the axis, adjacent thereto with an inclined surface of smaller inclination and adjacent said inclined surface with another surface of relatively stronger inclination, said surfaces corresponding to neutral, blocking and force-locking engagement positions of said clutch.

24. A disengageable shaft clutch according to claim 23, wherein both pins are provided with such transmission surfaces.

25. A disengageable shaft clutch according to claim 24, wherein at least one of said pins is provided with inclined surfaces joined smoothly.

26. A disengageable shaft clutch according to claim 25, wherein said one pin is provided with a semi-circular cross section into which are machined said surfaces extending parallel to the axis.

27. A disengageable shaft clutch according to claim 1, further comprising a rigid housing part, and sleeve means arranged on said housing part which is axially movable and is in operative engagement with said axially movable clutch part.

28. A disengageable shaft clutch according to claim 1, wherein said clutch is provided with engaging friction surfaces extending perpendicular to the axis and wherein at least part of said friction surfaces is formed as a clutch disk arranged between two clutch portions, one of said clutch portions being axially movable.

29. A disengageable shaft clutch according to claim 28, wherein the axially movable clutch portion consists of a clutch pressure disk simultaneously constituting said synchronizing ring means and of a carrier part carrying the same, said pressure disk being provided with a sinusoidally shaped curved cam track for abutment against said carrier part.

30. A disengageable shaft clutch according to claim 29, further comprising compression spring means between said pressure disk and said carrier part.

31. A disengageable shaft clutch according to claim 30, wherein the movement of said pressure disk with respect to the carrier part is limited by limit means disposed therebetween, said movement being smaller than the lift of said sinusoidally shaped curved cam track.

32. A disengageable shaft clutch according to claim 1, wherein said one clutch part includes an axially movable portion consisting of pressure disk and carrier part therefor and an axially immovable clutch portion, said transmitting means being constituted by pins secured to said axially movable and axially immovable clutch portions.

33. A disengageable shaft clutch according to claim 32, further comprising a truncated conical surface at said carrier part cooperating with flyweights accommodated in said axially immovable clutch portion.

34. A disengageable shaft clutch, particularly for motor vehicles, including input and output means and force-lockable friction surfaces for intercoupling said input and output means, comprising a plurality of clutch parts, one of said clutch parts being axially movable with respect to another clutch part, transmission means between two of said clutch parts constituting transmission surfaces to move the same in unison in the circumferential direction and to simultaneously produce an axial force seeking to engage the clutch, and means including a synchronizing ring between one of said clutch parts and another clutch part normally preventing force-locking engagement of said friction surfaces except with essential synchronism in the rotation of said input and output means thereof.

35. A disengageable shaft clutch according to claim 34, wherein said last-mentioned means includes abutment means between two portions of said axially movable clutch part to limit axial movement thereof in the absence of synchronism.

36. A disengageable shaft especially a main clutch for motor vehicles, comprising a first clutch part axially immovable, a second clutch part axially movable with respect to said first clutch part for purposes of engagement, and synchronizing ring means at one of said two clutch parts provided with a friction surface and including means enabling limited movement of said synchronizing ring means relative to said one clutch part to provide a first position thereof in which the axial movement of said second clutch part is blocked and a second position for releasing the further axial movement of said second clutch part in the axial direction thereof corresponding to the force-locking position of said two clutch parts, and means operatively connected between said two clutch parts to produce an axial thrust from the torque including inclined surfaces providing a lesser inclination to the axis of said clutch in said first position than in the force-locking position of said clutch.

37. Clutch apparatus according to claim 1, further including a spring biased member for preventing axial movement of said one clutch part, said member being movable against its spring bias to permit axial movement of said one clutch part when said member achieves a predetermined rotational speed about the clutch axis.

References Cited in the file of this patent

UNITED STATES PATENTS

| | | |
|---|---|---|
| 1,013,979 | Wirtz | Jan. 9, 1912 |
| 1,954,126 | Griswold | Apr. 10, 1934 |
| 1,969,698 | Lyman | Aug. 7, 1934 |
| 2,019,783 | Griswold | Nov. 5, 1935 |
| 2,081,061 | Murray | May 18, 1937 |
| 2,627,956 | Perkins | Feb. 10, 1953 |